(No Model.)

J. D. DANIEL.
WINDLASS.

No. 447,764.        Patented Mar. 10, 1891.

Witnesses                            Inventor
H. G. Dieterich.            John D. Daniel.
Geo. L. Wheelock.    By his Attorneys,
                          C. A. Snow & Co.

United States Patent Office.

JOHN DEBERNIER DANIEL, OF MAYFIELD, NORTH CAROLINA.

WINDLASS.

SPECIFICATION forming part of Letters Patent No. 447,764, dated March 10, 1891.

Application filed September 5, 1890. Serial No. 363,981. (No model.)

*To all whom it may concern:*

Be it known that I, JOHN DEBERNIER DANIEL, a citizen of the United States, residing at Mayfield, in the county of Rockingham and State of North Carolina, have invented a new and useful Windlass, of which the following is a specification.

My invention relates to an improvement in windlasses, and has for its object the construction of a windlass in such a manner as that there will be no danger of being hit by the handle when lowering a bucket into a well. Hence a child may operate the device with safety.

My invention consists in certain features of novelty to be hereinafter described, and then pointed out in the claim.

Figure 1:
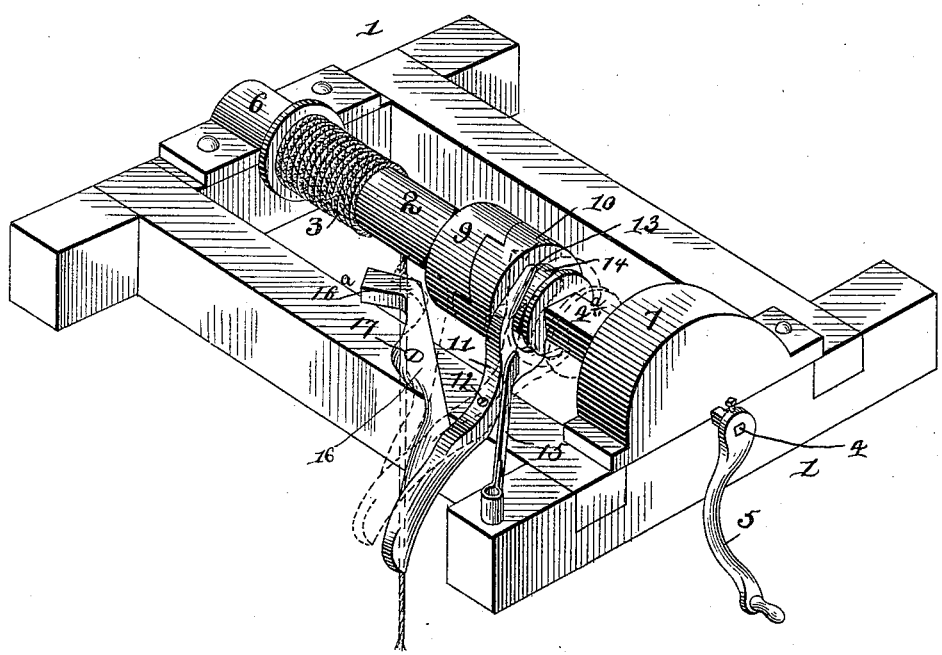
Figure 2:
Figure 3:
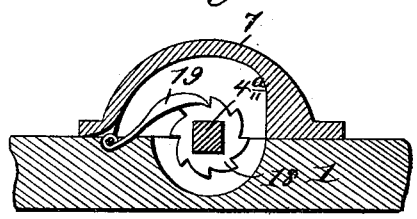

In the drawings, Figure 1 is a perspective showing in full lines the normal condition of the parts and showing in dotted lines the clutch thrown out of action. Fig. 2 is a detail showing the bearing of the drum at the end of the shaft. Fig. 3 is a detail showing the ratchet-wheel and detent to prevent the turning of the handle or crank in but one direction.

1 represents the frame; 2, the drum on which may be wound the rope 3; 4, the shaft; 5, the crank on the outer end of the shaft; 6, the boxing for the journal at one end of the shaft, and 7 the boxing for other end of the shaft. The drum has an axial opening 8, which receives the shaft 4 and on which the drum has bearing. At the inner end of the drum is a fixed clutch member 9, and on the shaft is a sliding clutch member 10, having a rectangular or non-circular orifice that fits on a squared portion 4ª of the shaft, said sliding member when brought into engagement with the fixed member of the clutch locking the drum and shaft together in such a manner as that when the drum is turned in the proper direction the rope is wound thereon.

11 is a lever pivoted to the frame at 12 and having a forked end 13, that engages in a circumferential groove 14 in the sliding clutch member in such a manner as that when thrown outwardly against the action of the spring 15 the clutch members will be separated; but when said forked end is thrown inwardly by the spring the drum may be turned.

16 is a brake-lever pivoted to the frame at 17. The handle of said brake-lever engages the handle of the spring-actuated lever 11, and the two levers may be simultaneously operated by one hand. The inner end of lever 16 has a shoe 16ª, adapted to bear against the periphery of the clutch member 9 of the drum.

Normally the spring 15 operates the lever 11 to hold the clutch-collar 10 in engagement with the clutch member 9, thus causing the drum to revolve with the shaft when the latter is rotated. By pressing the handles of the levers in the direction of the arrow in Fig. 1 the clutch will be disengaged and the shoe of the brake-lever 16 will be caused to bear against the periphery of the clutch member 9, thus retarding the rotation of the drum when the bucket or other weight attached to the rope descends. As the sliding clutch member 10 is now out of engagement with the fixed member 9, the shaft and its crank will not turn, but the drum will turn on the shaft. In this way the crank is prevented from flying around and striking the operator. As a further security against the backward movement of the crank, there is fixed on the shaft 4 a ratchet-wheel 18, engaged by a detent 19, both within the boxing 7. This detent will permit the crank to be turned forward, but not backward.

The pressure of the brake may be regulated by the lever 11.

What I claim as new is—

In a windlass, the combination of the shaft, the drum mounted revolubly upon the shaft and having a clutch member, the clutch-collar mounted slidingly upon a squared portion of the shaft and having an annular groove, a bifurcated lever pivoted on the frame and engaging said groove, a spring bearing against said lever to hold the clutch normally in gear, and an independent brake-lever having a shoe adapted to engage the periphery of the clutch member of the drum and provided with a handle lying in the path of the handle of the clutch-operating lever, substantially as and for the purpose set forth.

In testimony that I claim the foregoing as my own, I have hereto affixed my signature in presence of two witnesses.

JOHN DEBERNIER DANIEL.

Witnesses:
J. W. WILLERUS,
F. G. MCKINNEY.